United States Patent

[11] 3,554,507

[72] Inventors Sergei Mikhailovich Andoniev
Prospekt Pravdy 5, kv.60, Kharkov;
Mark Nikolaevich Berman, ul. Artema 64,
kv.7; Georgy Gavrilovich Zhitnik, Bulvar
Pushkina 25, kv.35; Evgeny Mikhailovich
Kon.'ratiev, Prospekt Metallurgov 107;
Yakov Matveevich Levitasov, Kvartal
15/16, dom 11, kv.14, Donetsk; Konstantin
Ivanovich Makarov, Varshavskoe shosse
135-a, korpus 3, kv.149, Moscow; Nikolai
Ivanovich Pevny, Kharkov, Komsomolskoe
shosse 59/12, kv.2, Kharkov; Leonid
Moiseevich Pokrass, Pionerskaya ul. 69,
Donetsk; Alexandr Markovich Pochtman,
Prospekt Pravdy 5, kv.41, Kharkov; Mark
Anisimovich Robin, 2 kvartal 11, kv.19;
Pavel Alexandrovich Tesner, ul.
Chaplygina 2, kv. 3, Moscow; Felix
Isaakovich Sheinfain, Pushkinskaya ul. 20,
kv.18, Donetsk; Oleg Vladimirovich
Filipiev, Prospekt Pravdy 5, kv.41b,
Kharkov, U.S.S.R.
[21] Appl. No. 751,621
[22] Filed Aug. 9, 1968
[45] Patented Jan. 12, 1971

[54] REGENERATIVE REVERBERATORY
PREDOMINANTLY OPEN HEARTH, GAS-FIRED
FURNACE
4 Claims, 1 Drawing Fig.

[52] U.S. Cl. .................................................. 263/15
[51] Int. Cl. .................................................... F23l 15/02
[50] Field of Search........................................... 263/15,
15C, 15D

[56] References Cited
UNITED STATES PATENTS
2,171,597  9/1939  Parker........................... 263/15X
3,345,054 10/1967  Andonjev et al............... 263/15X Primary Examiner—John J. Camby
Attorney—Waters, Roditi, Schwartz & Nissen ABSTRACT: A regenerative reverberatory furnace is equipped with apparatus defining a reformation chamber for the partial combustion of gas to obtain soot. Communicating with the reformation chamber is a primary gas supplying conduit and a primary air supplying conduit, each of which conduits is provided with a shutoff device. The air supplying conduit is provided with a channel for bypassing the air shutoff device. Interposed between and communicating with both the gas supplying conduit and the reformation chamber is an alternate gas supplying channel also provided with a shutoff device. When the shutoff devices in each of the primary gas and air supplying conduits are closed, the shutoff devices in the air bypass channel and in the alternate gas supplying channel remain open to provide a continuous supply of combustible material to the chamber to continuously heat the chamber lining.

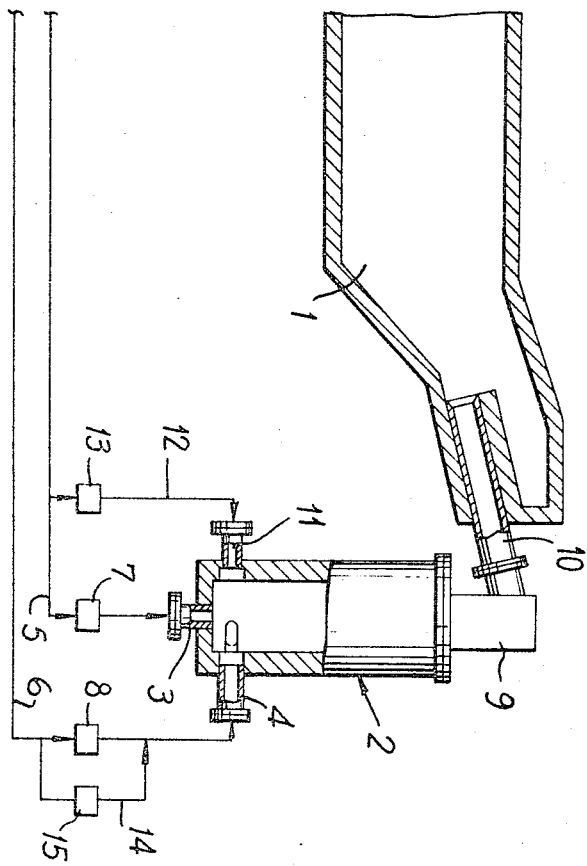

REGENERATIVE REVERBERATORY PREDOMINANTLY OPEN HEARTH, GAS-FIRED FURNACE

This invention relates to regenerative gas-fired reverberatory furnaces.

More particularly this invention relates to open hearth furnaces being fired with cold high calorific gas, such as natural or coke oven gas or thereof.

The invention can also be implemented in any branch of industry requiring a luminous flame of the natural gas without addition of liquid fuel.

The known regenerative furnaces fired with natural gas are provided at each heated side with outside reaction chambers of reformators for partial combustion of gas, for obtaining soot-gas mixture, as well as with means for delivering said mixture together other fuel gases into the furnace.

A highly luminous flame is thus developed, the luminosity of which is controlled by varying the quantity of soot in the soot-gas mixture.

A gastight metal casing of the reaction chamber has a refractory lining. The gas used for furnace firing is supplied into the chamber axially while air is supplied transversely into the chamber. The air flow rate is usually 3.5—4.0 times as great as that of the gas.

The temperature of the incomplete combustion products leaving the chamber and consequently the temperature of the walls of the chamber lining is set depending on the ratio of the air-gas flow.

Hereinafter the given temperature of the partial combustion products will be called a temperature of reformation.

The temperature of reformation is one of the factors influencing the soot yield. The increase or decrease of the temperature leads to a corresponding decrease or increase in the soot yield.

In the well known regenerative furnaces being fired for a long period of time from one side only, the lining of the chamber located on the other side not being fired is cooled. When this unfired chamber is put into operation, the temperature of its lining can be insufficient for ignition of the gas, and the process of reformation may not start.

Even if gas ignites, the soot yield would be relatively small until the temperature of the lining of the chamber reaches a definite value corresponding to that of heat equilibrium condition at the given temperature of the process of reformation.

The object of the present invention is the elimination of the above disadvantages and provision of such a regenerative reverberatory furnace which being of relatively simple design would ensure a constant temperature of the lining corresponding to the heat equilibrium condition of the reformator in operation.

In accordance with the above object, there is proposed a regenerative reverberatory furnace and particularly an open hearth furnace being fired with natural gas at incomplete combustion of a part of same up to soot formation in the reaction chambers arranged outside the furnace at each heated side, each of which communicating with a nozzle for supplying the products of incomplete combustion into the furnace.

In accordance with the invention, each reaction chamber is equipped with a burner arrangement for maintaining the temperature of the lining at constant level after the process of incomplete combustion in the reformator has been stopped.

In the preferred embodiment of the regenerative reverberatory furnace in accordance with the present invention, it is expedient to provide communication between the burner arrangement of the pipelines for delivery of gas and air into the chamber by means of bypass lines with the shutoff means being opened, when the process of incomplete combustion of gas in the reaction zone ceases to keep constant the temperature of the lining of the reaction chamber.

It is expedient to provide a remote control drive for the shutoff means mounted in the bypass lines and to connect it to the general system of reversing the furnace heating from one of its sides to the other.

Given hereinbelow is a description of an exemplary embodiment of the present invention with reference to the accompanying drawing, diagrammatically representing a half of a symmetric open hearth furnace complete with reaction chambers (a longitudinal section).

As it will become evident from the drawing, the regenerative reverberatory furnace 1 has reaction chambers or reformators 2 from each heated side and in both of same is mounted an axially directed branch pipe 3 and a transversely directed branch pipe 4, supported tangentially with respect to the chambers 2, for delivery of gas and air into the reaction chamber respectively for the incomplete combustion of gas and the forming of carbon particles or soot.

The branch pipes 3, 4 communicate with the gas line 5 and the air line 6 respectively via shutoff means 7, 8, the opening of which is regulated. Chamber 2 is connected to the refractory passageway 9 communicating with nozzle 10, through which the incomplete combustion products are fed into the furnace 1 providing together with other fuel gases a high velocity luminous flame.

Besides the said branch pipes 3, 4, mounted in each chamber 2 is a branch pipe 11 communicating with gas line 5 by means of a bypass line 12 with a shutoff means 13. At the alternate disconnection of the chambers in the course of the furnace operation, the branch pipe 3 of chamber 2 disconnects from the gas line 5 by means of a shutoff means 7 and the branch pipe 11 is connected to the gas line 5 through a shutoff means 13 mounted in the bypass line 12.

Supplied through the branch pipe 11 is a relatively small quantity of gas (say 20—40 cu.m. per hour) depending on the heat losses by the chamber 2.

Delivered simultaneously through branch pipe 4 is a relatively small quantity of air making provision for a complete combustion of gas being fed through branch pipe 11. For this purpose the air line 6 is provided with a bypass line 14 complete with a shutoff means 15.

The branch pipes 4, 11 form a burner arrangement being put into the operation when the chamber 2 is disconnected from the gas line 5 and the air line 6 by the aid of shutoff means 7, 8. When the said burner arrangement in the chamber is in operation, there is completely burned a quantity of gas which is required for the generation of heat compensating the heat losses by the lining of the chamber 2 into the environment and thus keeping the temperature of the lining constant.

For this purpose, the opening of the shutoff means 13, 15 in the bypass lines 12, 14 is regulated for passing adequate quantities of gas and air.

The completeness of combustion of gas during the operation of the burner arrangement is achieved by means of delivery of an excessive quantity of air (with the excess air coefficient of say 1.5 and over) into the chamber. The high temperature of the lining walls provides for a secure gas ignition while the diffusion flame combustion of gas provides for stability of the burning process.

When the furnace heating is reversed to another side, there is provided an automatic shutoff of means 7, 8 and disconnection of chamber 2 from the furnace 1 operation control system. Such control systems are well known and therefore no description is given hereinbelow.

To automate the operation of the said burner arrangement, the shutoff means 13, 15 in the bypass lines 12, 14 are remotely controlled in the known way, and the control system of the said means is connected to the general automatic control system of furnace 1, (not shown).

At automatic shutoff of means 7, 8 there are simultaneously automatically opened the shutoff means 13, 15 to a given extent.

The burner arrangement, in accordance with this invention, can operate without automatic control for closing the shutoff means 13, 15. In this embodiment, the bypass lines 12, 14 are sized to pass the given quantities of gas and air while the shutoff means in same serve for disconnecting the burner arrangement only (when the operation of furnace 1 or chamber 2 ceases because of bringing the furnace to a standstill for repair work etc.). The operation of the burner arrangement, according to this embodiment, is also possible with nonsized sections of the bypass lines 12, 14. In this case, the shutoff means 13, 15 remain constantly open to a given extent. In this case a certain amount of gas will be fed into the air flow supplied through the branch pipe 4 and travelling as a helical stream at the walls of the chamber lining, said gas being completely burned and thus liberating an addition quantity of heat. In this case, to keep the temperature of reformation at the former level, the extent of opening of the shutoff means 7, 8 in the gas line 5 and the air line 6 will have to be accordingly reduced. At preventive maintenance or an emergency stopping of operation of chamber 2 or of furnace 1, the shutoff means 13, 15 will have to be closed manually.

The possibility of utilization of the branch pipes 3, 4 as the burner arrangement is not excluded. In such a case the end of the bypass line 12 is to be connected to branch pipe 3 while the branch pipe 11 is not to be mounted. Nevertheless, the aerodynamics of the flame being developed by the burner arrangement thus manufactured would be worse than that of the embodiment providing for utilization of branch pipe 11. This is connected with a decrease in the velocity of gas in branch pipe 3 having a greater cross section than that of the branch pipe 11.

We claim:

1. Apparatus in combination with a regenerative reverberatory furnace, said apparatus comprising means defining a reformation chamber in communication with said furnace, gas burning means included in said chamber for the partial combustion of gas to obtain soot, first channel means in communication with said reformation chamber for supplying gas into said chamber, first shutoff means included in said first channel means for controlling the quantity of gas being supplied into said chamber, second channel means in communication with said reformation chamber for supplying air into said chamber, second shutoff means included in said second channel means for controlling the quantity of air being supplied into said chamber, third channel means interposed between and in communication with both said chamber and said first channel means for supplying gas into said chamber, third shutoff means included in said third channel means for controlling the quantity of gas being supplied into said chamber, bypass means included in said second cannel means for bypassing said second shutoff means, and fourth shutoff means included in said bypass means for controlling the quantity of air bypassing said second shutoff means.

2. The combination as claimed in claim 1, wherein said third and fourth shutoff means are open when said first and second shutoff means are closed.

3. The combination as claimed in claim 1 wherein said first channel means includes a nozzle supported coaxially on said chamber and said second channel means includes a nozzle supported on said chamber extending transversely and tangentially thereof.

4. The combination as claimed in claim 3 wherein said third channel means includes a nozzle supported on said chamber transversely thereof.